UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

LIQUID FUEL.

1,419,910.      Specification of Letters Patent.      Patented June 20, 1922.

No Drawing.      Application filed October 12, 1917. Serial No. 196,178.

*To all whom it may concern:*

Be it known that I, ARTHUR A. BACKHAUS, of Baltimore and in the State of Maryland, have invented a certain new and useful Improvement in Liquid Fuel (Case 5), and do hereby declare that the following is a full, clear, and exact description thereof.

My invention relates particularly to fuels designed to be used in any desired manner, but it has application especially to fuels adapted to be used as a source of power, as for example fuels for burners and motor fuels.

The object of my invention is to provide a fuel containing a petroleum hydrocarbon, as well as alcohol, and an ingredient adapted to blend the same or form a solution with the hydrocarbon and alcohol.

A further object of my invention is to provide a fuel of this character, which is of such a nature that only a very small quantity of the third ingredient is found necessary.

A further object is to provide a fuel of this character which contains a large percentage of the petroleum hydrocarbon, notwithstanding the small percentage of the third ingredient.

A further object is to provide a fuel of this character in which the third ingredient is an aromatic hydrocarbon.

Further objects of my invention will appear from the detailed description thereof contained hereinafter.

While my invention is capable of being carried out in different ways, for the purpose of illustration I shall describe only certain ways of carrying out the same herein.

For example, a fuel made in accordance with my invention may be made as follows: The fuel may be comprised of:—

25 parts by volume of ethyl alcohol,
25 parts by volume of gasolene,
25 parts by volume of kerosene,
19 parts by volume of benzol.

As another example of my invention, the fuel may be comprised of:—

35 parts by volume of ethyl alcohol,
25 parts by volume of gasolene,
25 parts by volume of kerosene, and
17 parts by volume of benzol.

As another example of my invention, the fuel may be comprised of:—

25 parts by volume of ethyl alcohol,
25 parts by volume of gasolene, and
5 parts by volume of toluene.

As still another example of my invention, the fuel may be comprised of:—

25 parts by volume of ethyl alcohol,
25 parts by volume of gasolene,
25 parts by volume of kerosene, and
32 parts by volume of toluene.

Again, as another example of my invention, the fuel may be comprised of:—25 parts by volume of a solution containing 96% by weight of ethyl alcohol and 4% by weight of naphthalene, mixed with 25 parts by volume of gasolene and 25 parts by volume of kerosene.

Instead of using an aromatic hydrocarbon alone as the blending agent, I may also use, in addition thereto, a phenol, such for example as carbolic acid or cresol.

As such an example of my invention, the fuel may be comprised of:—

25 parts by volume of kerosene,
25 parts by volume of gasolene,
25 parts by volume of ethyl alcohol,
4 parts by volume of cresol, and
4 parts by volume of benzol.

As still another such example, the fuel may be comprised of:—

25 parts by volume of ethyl alcohol,
25 parts by volume of kerosene,
25 parts by volume of gasolene,
15 parts by volume of toluene,
15 parts by volume of benzol, and
15 parts by volume of cresol.

Again, it is to be understood that additional blending agents may be added, as for example aromatic nitro compounds, etc.

As such an example of my invention, the fuel may be comprised of:—

25 parts by volume of kerosene,
25 parts by volume of gasolene,
25 parts by volume of ethyl alcohol,
17 parts by volume of methyl alcohol,
17 parts by volume of benzol,
17 parts by volume of nitrobenzol,
17 parts by volume of cresol,
17 parts by volume of toluene.

Furthermore, it is to be understood that any of the other aromatic hydrocarbons may be used instead of the particular aromatic hydrocarbons above referred to, such for example as anthracene.

Furthermore, it is to be understood that, instead of the mixture of kerosene and gasolene, I may use merely gasolene.

Other subject matter above described has been claimed in applicant's Patent 1,271,115, patented July 2, 1918.

While I have described my invention above in detail, I wish it to be understood that many changes may be made therein without departing from the spirit thereof.

I claim:

1. A fuel comprising a petroleum distillate, an alcohol, an aromatic hydrocarbon, and a phenol adapted to blend the other constituents.

2. A fuel comprising a petroleum distillate, an alcohol, benzol, and a phenol adapted to blend the other constituents.

3. A fuel comprising a petroleum distillate, an alcohol, an aromatic hydrocarbon and cresol adapted to blend the other constituents.

4. A fuel comprising a petroleum distillate, an alcohol, benzol and cresol adapted to blend the other constituents.

5. A fuel comprising gasolene, an alcohol, an aromatic hydrocarbon and a phenol adapted to blend the other constituents.

6. A fuel comprising gasolene, an alcohol, benzol and a phenol adapted to blend the other constituents.

7. A fuel comprising gasolene, an alcohol, an aromatic hydrocarbon and cresol adapted to blend the other constituents.

8. A fuel comprising gasolene, an alcohol, benzol and cresol adapted to blend the other constituents.

9. A fuel comprising gasolene, ethyl alcohol, an aromatic hydrocarbon and a phenol adapted to blend the other constituents.

10. A fuel comprising gasolene, ethyl alcohol, benzol and a phenol adapted to blend the other constituents.

11. A fuel comprising gasolene, ethyl alcohol, an aromatic hydrocarbon and cresol adapted to blend the other constituents.

12. A fuel comprising gasolene, ethyl alcohol, benzol and cresol adapted to blend the other constituents.

13. A fuel comprising a petroleum distillate, ethyl alcohol, an aromatic hydrocarbon and a phenol adapted to blend the other constituents.

14. A fuel comprising a petroleum distillate, ethyl alcohol, benzol and a phenol adapted to blend the other constituents.

15. A fuel comprising a petroleum distillate, ethyl alcohol, an aromatic hydrocarbon and cresol adapted to blend the other constituents.

16. A fuel comprising a petroleum distillate, ethyl alcohol, benzol and cresol adapted to blend the other constituents.

In testimony that I claim the foregoing I have hereunto set my hand.

ARTHUR A. BACKHAUS.